(12) United States Patent
Fan (10) Patent No.: US 8,081,431 B2
(45) Date of Patent: Dec. 20, 2011

(54) HEIGHT-ADJUSTABLE STAND AND FLAT PANEL DISPLAY UTILIZING THE SAME

(75) Inventor: Gang-Tao Fan, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/886,544

(22) Filed: Sep. 20, 2010

(65) Prior Publication Data
US 2011/0255222 A1 Oct. 20, 2011

(30) Foreign Application Priority Data
Apr. 19, 2010 (CN) .......................... 2010 1 0149600

(51) Int. Cl.
*H05K 5/00* (2006.01)
*H05K 7/00* (2006.01)
(52) U.S. Cl. ......... 361/679.05; 361/679.06; 361/679.07; 361/679.21; 361/679.22; 248/917; 248/918; 248/919; 248/920
(58) Field of Classification Search ............ 361/679.05, 361/679.06, 679.07, 679.21, 679.22; 248/917, 248/918, 919, 920
See application file for complete search history.

(56) References Cited

U.S. PATENT DOCUMENTS

| 7,124,984 B2* | 10/2006 | Yokouchi et al. .......... 248/125.8 |
| 7,667,957 B2* | 2/2010 | Lee ........................... 361/679.22 |
| 7,854,416 B2* | 12/2010 | Chen et al. .................... 248/161 |
| 2004/0011932 A1* | 1/2004 | Duff .............................. 248/157 |
| 2006/0238966 A1* | 10/2006 | Sung ............................. 361/681 |
| 2007/0195495 A1* | 8/2007 | Kim et al. ..................... 361/681 |
| 2008/0024967 A1* | 1/2008 | Lee ................................ 361/683 |
| 2009/0154083 A1* | 6/2009 | Katsumata et al. ....... 361/679.07 |

* cited by examiner

*Primary Examiner* — Anthony Haughton
(74) *Attorney, Agent, or Firm* — Altis Law Group, Inc.

(57) ABSTRACT

A height-adjustable stand includes a base defining a receiving space and a sidewall. A height extender is slidably received in the receiving space and includes a front wall and an upper connecting end. The front wall defines a number of slots arranged along a sliding direction of the height extender. The upper connecting end is configured for connecting with a flat panel display device. A positioning member includes a threaded rod and a flange extending outward from the threaded rod. The threaded rod slidably extends through the sidewall of the base and includes a distal end. The distal end is able to be received in one of the slots to set the height extender in a desired position. The flange is external to the receiving space of the base. A locking member includes a nut and two guide rods protruding from the nut.

10 Claims, 8 Drawing Sheets

HEIGHT-ADJUSTABLE STAND AND FLAT PANEL DISPLAY UTILIZING THE SAME

BACKGROUND

1. Technical Field

The present disclosure relates to stands used in flat panel displays, and more particularly, to a height-adjustable stand for an LCD display device.

2. Description of Related Art

Generally, flat panel displays such as LCD displays are mounted on a stand that allows rotation of the display and adjustment of the height of the display area relative to the desktop. Typically, the stands use a spring or coil-type mechanism to control the height of the display, where the mechanism is designed to offset the weight of the display so that the display can be placed and remain at a desired height. However, one difficulty that often arises is that the balance between the weight of the stand and the force of the mechanism is not maintained and the stand unwontedly opens or extends to its full height or length during handling. Therefore, it is desirable to provide a new adjustable stand to overcome the aforementioned problems.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
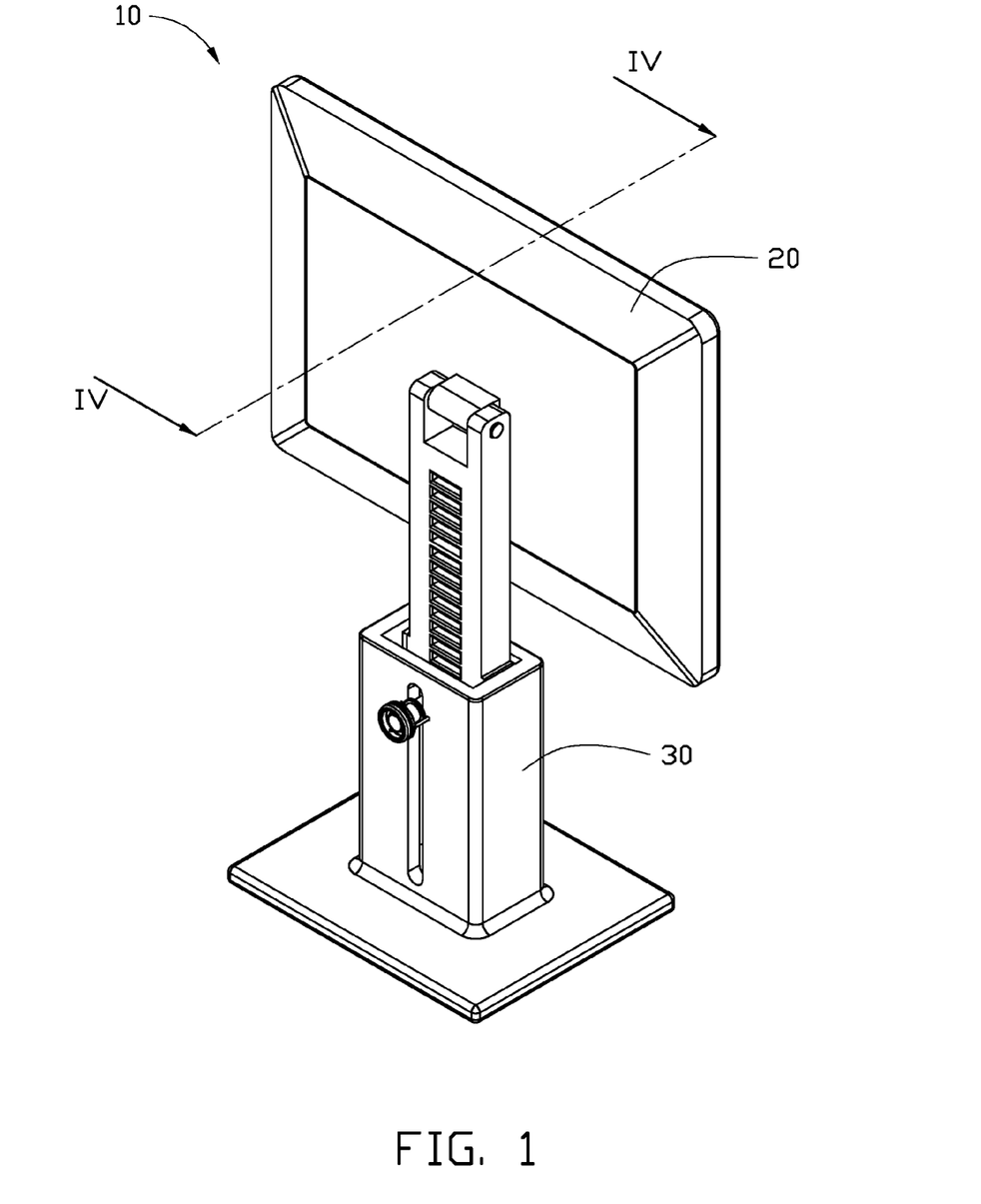
FIG. 1 is an isometric view of a flat panel display device in accordance with one embodiment.
Figure 2:
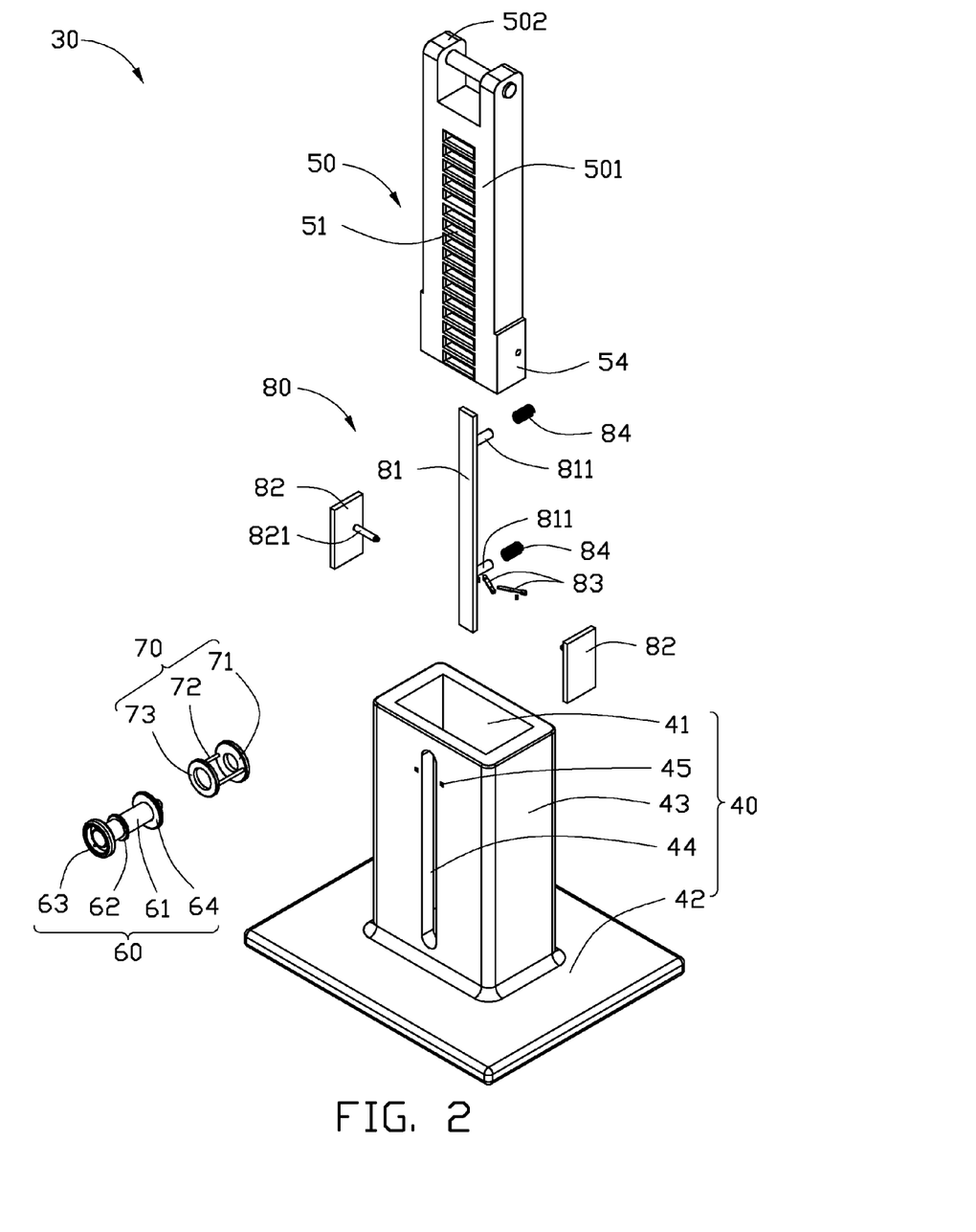
FIG. 2 is an isometric, exploded view of a stand of the display device of FIG. 1.

Referring to FIGS. 1 and 2, an LCD display 10 includes a display 20 and a stand 30 for supporting the display 10. The stand 30 includes a base 40 and a height extender 50. The base 40 includes a base plate 42 and a support member 43 protruding from the base plate 42. The support member 43 defines a receiving space 41 extending from its top toward the base plate 42. A front wall of the support member 43 defines a longitudinal slot 44 and two through holes 45 that communicate with the receiving space 41.

Figure 3:
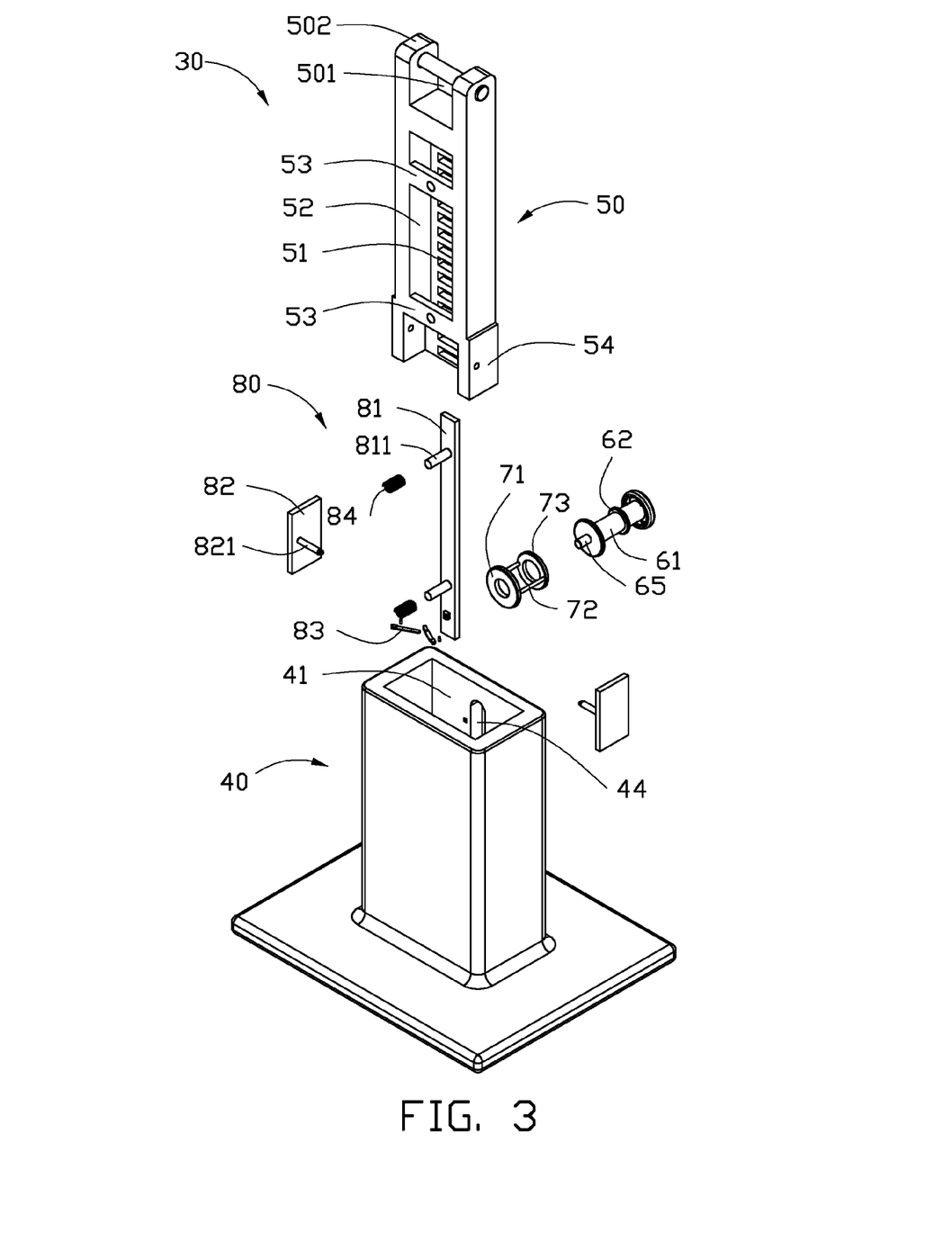
FIG. 3 is another isometric, exploded view of the stand of FIG. 2, from another viewpoint.

Referring also to FIG. 3, the height extender 50 includes a front wall 501 and two sidewalls 54 that collectively define a chamber 52. The front wall 501 defines a number of slots 51 arranged along its longitudinal direction. The height extender 50 also includes an upper end 502 for connecting with the display 20. The height extender 50 can be slidably received in the receiving space 41, with the slots 51 facing the slot 44 of the base 40.

Figure 4:
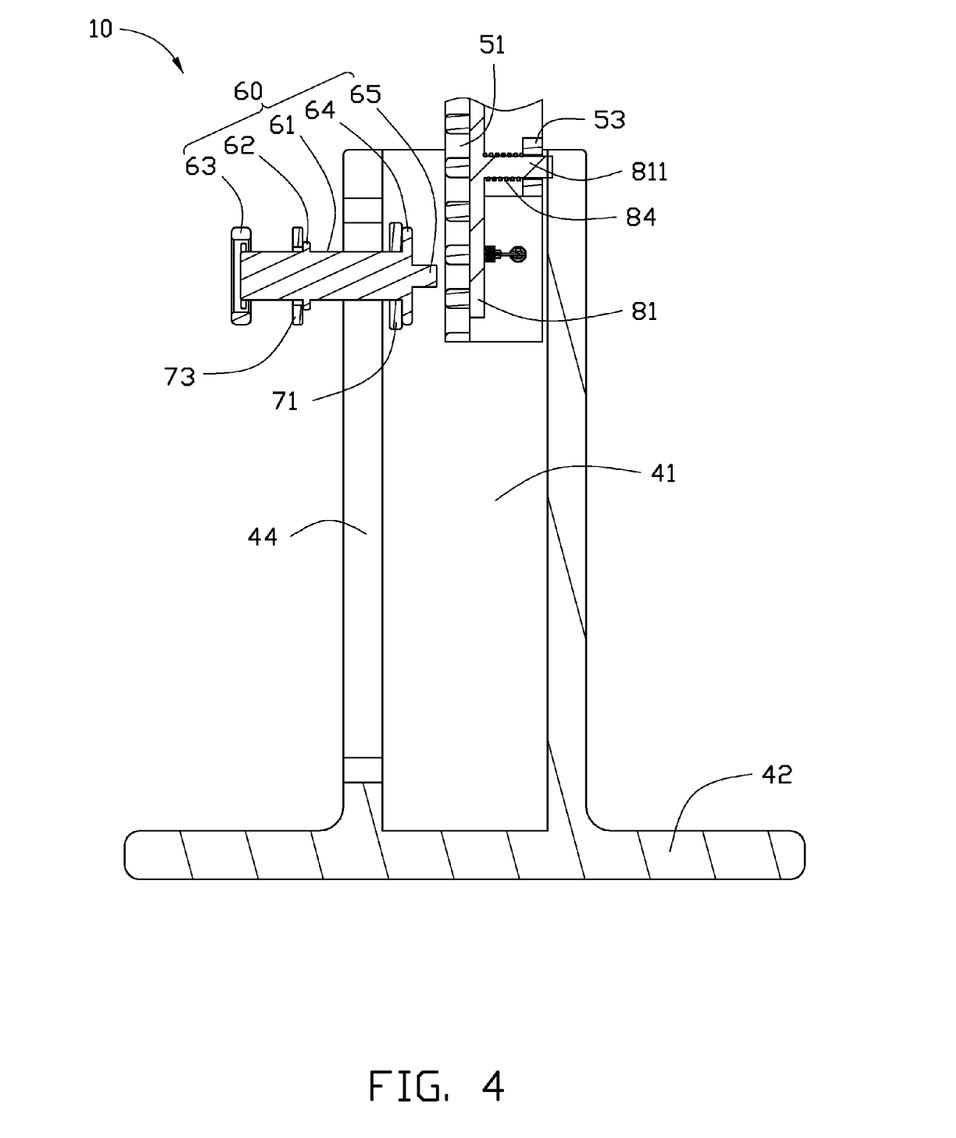
FIG. 4 is a planar cross-sectional view of the stand of FIG. 1, taken along the line IV-IV of FIG. 1 and with certain elements omitted for clarity.
Figure 5:
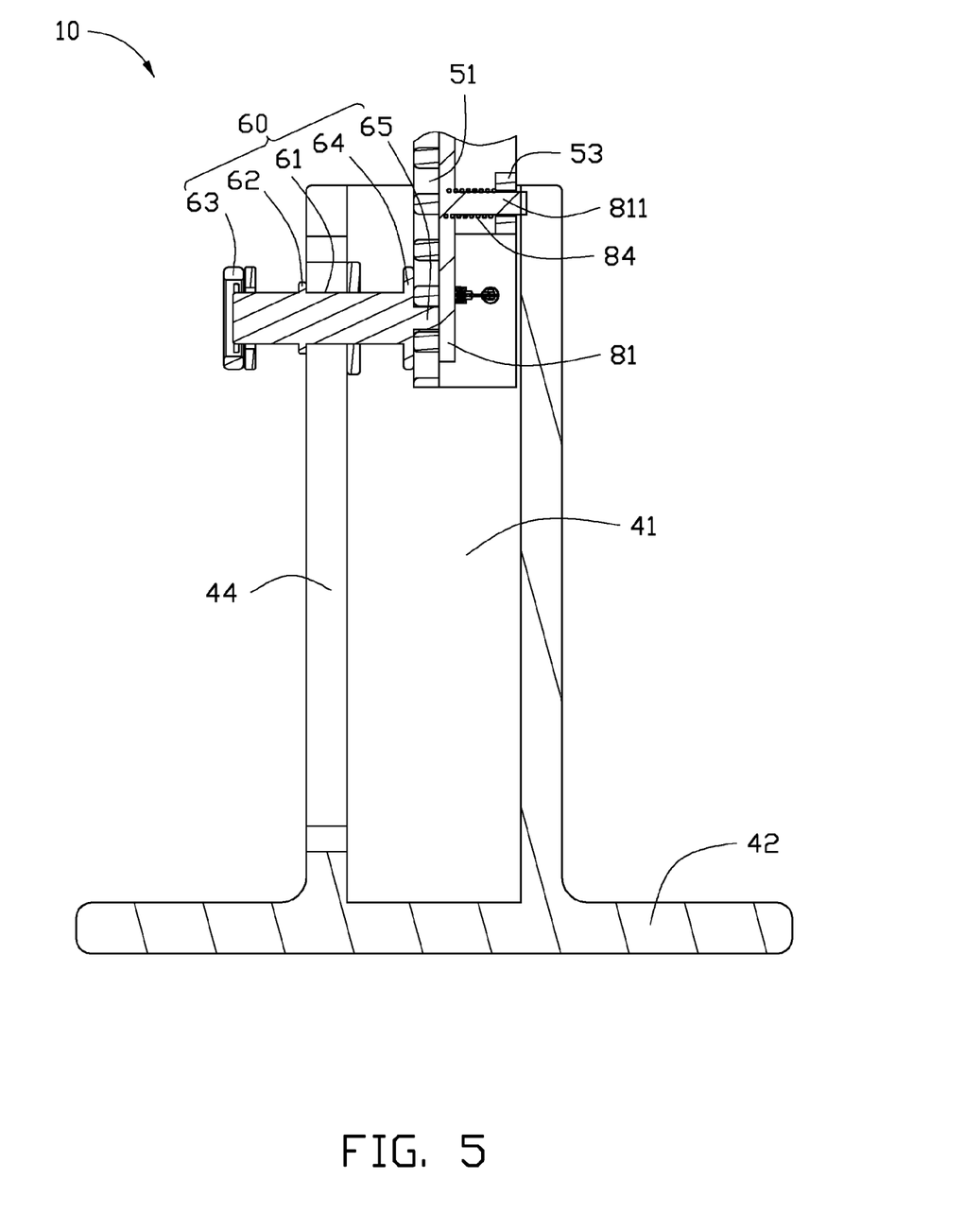
FIG. 5 is similar to FIG. 4, but showing the stand in a locked state.

The stand 30 also includes a positioning member 60 and a locking member 70. The positioning member 60 includes a threaded rod 61 and a flange 62 extending outwardly from the lateral surface of the rod 61. The positioning member 60 also includes a knob 63, a stop member 64, and a distal end 65. The knob 63 is formed at one end of the rod 61, and the stop member 64 is located at an opposite end of the rod 61. The stop member 64 and the threaded rod 61 may be separate parts that are secured together by any suitable connection techniques, such as threaded engagement. The distal end 65 protrudes from the stop member 64. Referring also to FIGS. 4 and 5, the threaded rod 61 extends through the slot 44 of the base 40. The stop member 64 is located within the receiving space 41 of the base 40, while the flange 62 is external to the receiving space 41.

Referring again to FIGS. 2, 3, and 4, the locking member 70 includes a nut 71, two guide rods 72 protruding from the nut 71, and a ring 73 located at the end of the guide rods 72. The nut 71 is located within the receiving space 41 of the base 40, and screwed on the threaded rod 61 of the positioning member 60. The two guide rods 72 respectively extend through the through holes 45 of the base 40, and can slide with respect to the support member 43. The ring 73 is located external to the receiving space 41.

In one embodiment, the external width of the two sidewalls 54 may be substantially equal to the width of the receiving space 41 of the base 40 to limit lateral movement of the height extender 50. When the distal end 65 of the positioning member 60 is received in one of the slots 51 of the height extender 50, the up and down movement of the height extender 50 is limited. Once the stop member 64 abuts against the height extender 50 and the sidewalls 54 abut against the back wall of the support member 43, the back and forth movement of the height extender 50 is limited. The height extender 50 is thus held in position.

When adjusting the height of the display 20, the positioning member 60 is pushed to cause its distal end 65 to be received in a desired slot 51 of the height extender 50. The positioning member 60 is then further pushed until the flange 62 contacts the front wall of the support member 43, causing the stop member 64 to abut against the height extender 50 and causing the sidewalls 54 to abut against the back wall of the support member 43. The knob 63 of the positioning member 60 is then turned along a predetermined direction, causing the nut 71 of the locking member 70 to move toward the front wall of the support member 43. Once the nut 71 contacts the support member 43, the positioning member 60 is secured to the support member 43.

Figure 6:
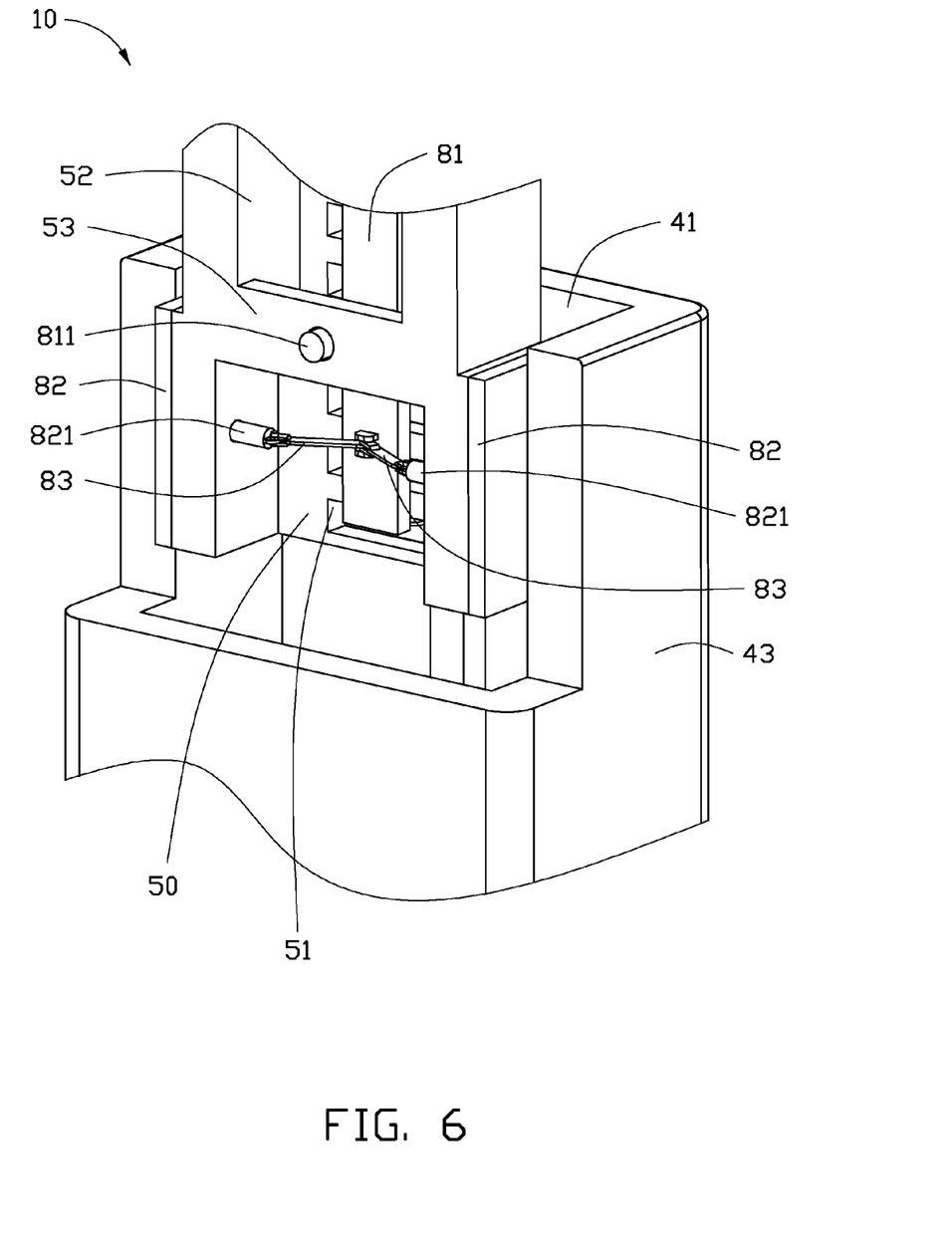
FIG. 6 is a partial, isometric view of the stand of FIG. 2.

In an alternative embodiment, the external width of the two sidewalls 54 may be less than the width of the receiving space 41 of the base 40. Referring again to FIGS. 2 and 3, the stand 30 also includes a stabilizing assembly 80 that includes an actuating plate 81, a pair of side plates 82, a pair of linkage bars 83, and a pair of elastic members 84. The height extender 50 also includes two rectangular members 53 between the two sidewalls 54 of the height extender 50. Referring to FIGS. 5 and 6, the actuating plate 81 is received in the chamber 52 of the height extender 50. The actuating plate 81 includes two sliding shafts 811 slidably extending through the rectangular members 53. The two elastic members 84 are respectively arranged around the sliding shafts 811, to apply a spring force to the actuating plate 81.

Each plate 82 is arranged between the sidewall 54 of the height extender 50 and the sidewall of the support member 43, and includes a protruding shaft 821 slidably extending through the sidewall of the support member 43. Two ends of each linkage bar 83 are rotatably connected to one protruding shaft 821 and the actuating plate 81.

Figure 7:
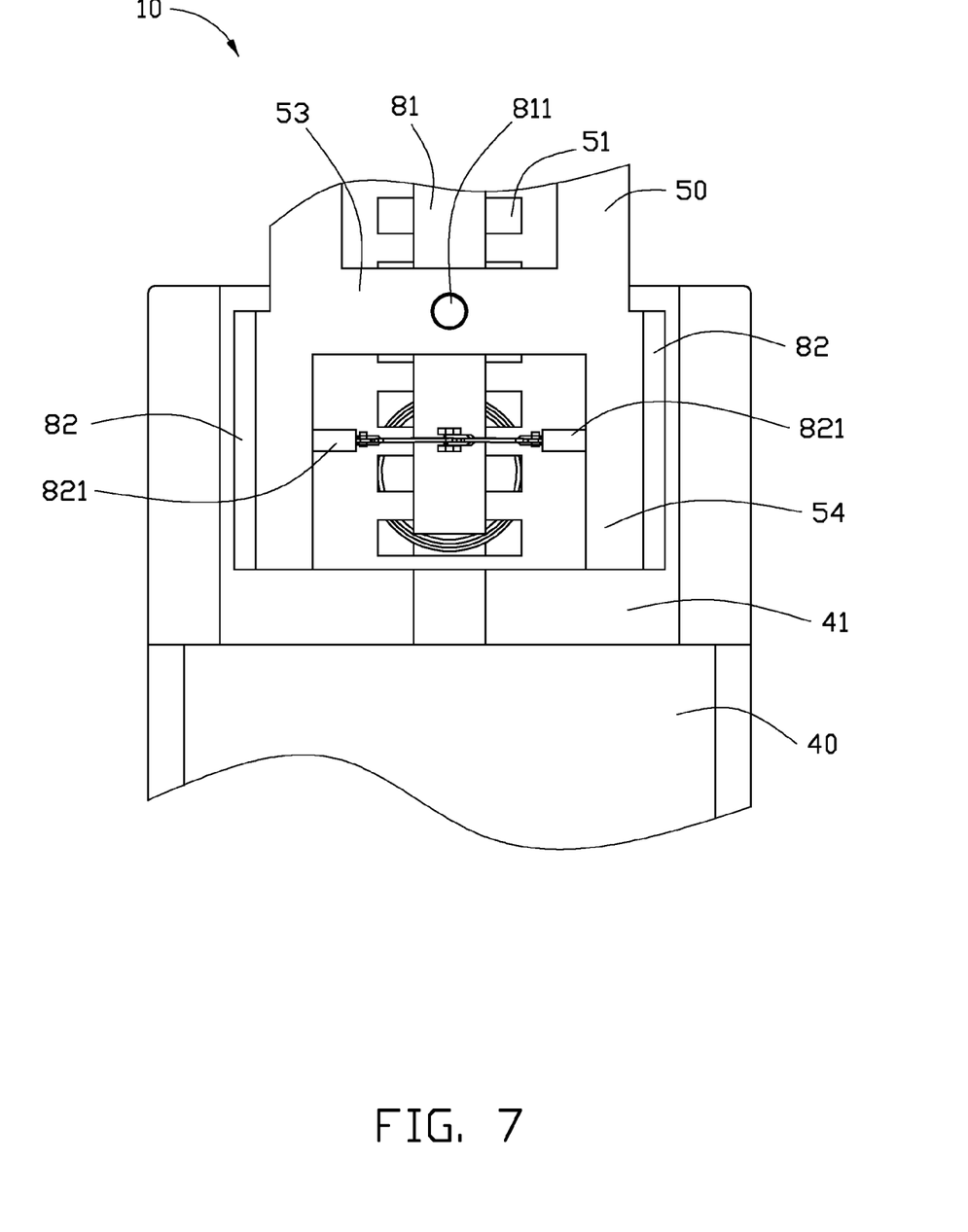
FIG. 7 is a partial, planar view of the stand of FIG. 2.
Figure 8:
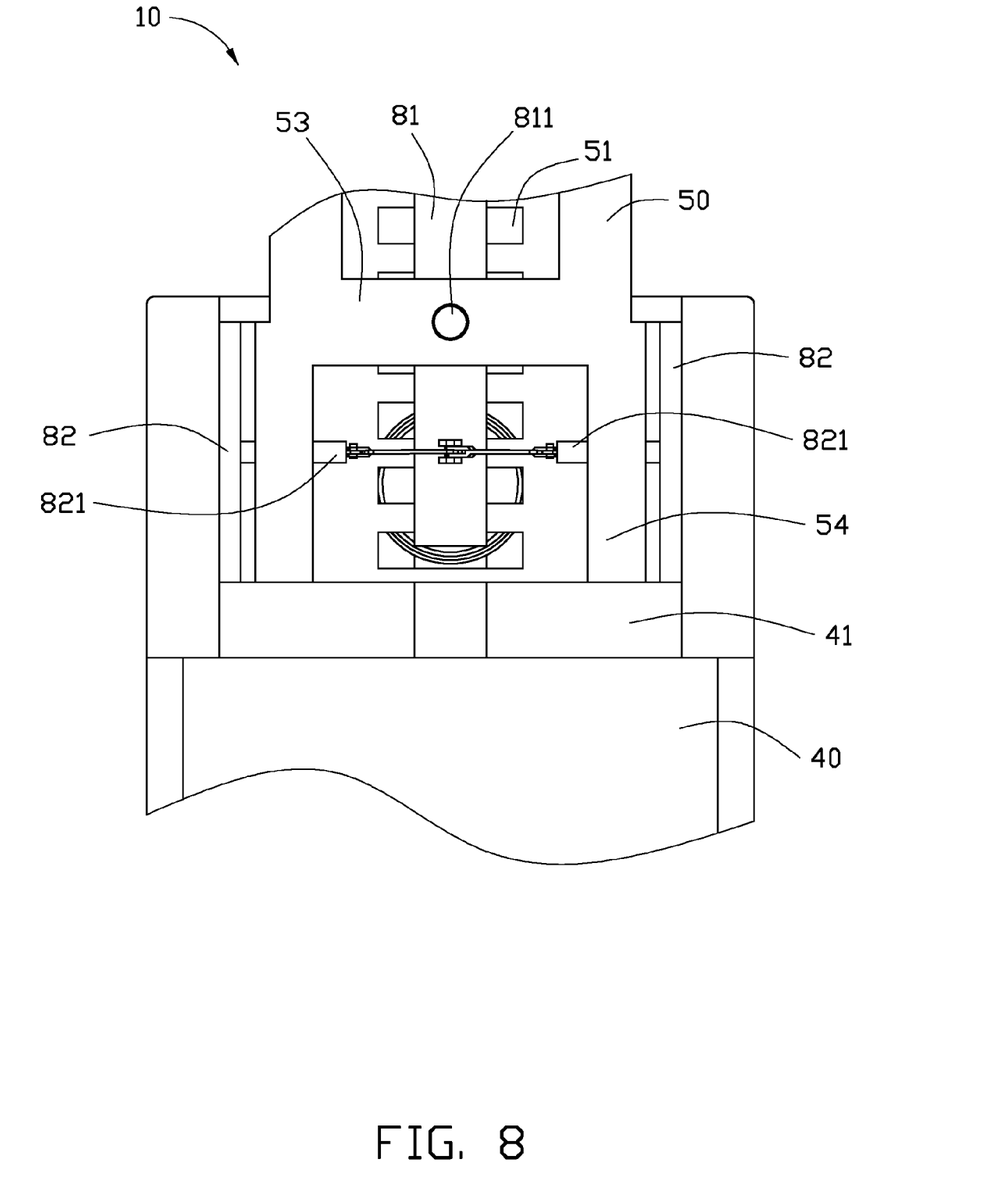
FIG. 8 is similar to FIG. 7, but showing the stand in a locked state.

Referring to FIGS. 6-8, when the positioning member 60 disengages from the height extender 50, the elastic member 84 pushes the actuating plate 81 to abut against the front wall 501, and the two linkage bars 83 form an angle. When being pushed by the distal end 65 of the positioning member 60, the actuating plate 81 moves and causes the linkage bars 83 to drive the side plates 82 to move toward the sidewalls of the support member 43. After the side plates 82 contact the sidewalls of the support member 43, lateral movement of the height extender 50 is limited.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A height-adjustable stand comprising:
a base defining a receiving space and a sidewall;
a height extender slidably received in the receiving space and comprising a front wall and an upper connecting end, the front wall defining a plurality of slots arranged along a sliding direction of the height extender, the upper connecting end being configured for connecting with a flat panel display device;
a positioning member comprising a threaded rod and a flange extending outwardly from the threaded rod, the threaded rod slidably extending through the sidewall of the base and comprising a distal end, the distal end being able to be received in one of the plurality of slots to set the height extender in a desired position, the flange being external to the base; and
a locking member comprising a nut and two guide rods protruding from the nut, the two guide rods slidably extending through the sidewall, the nut being arranged in the receiving space and being threaded on the threaded rod of the positioning member, wherein as the threaded rod turns about a predetermined direction, the nut moves toward the sidewall of the base and terminates when abutting against the sidewall.

2. The height-adjustable stand according to claim 1, wherein the positioning member further comprises a knob formed at one end of the threaded rod, the knob is external to the base.

3. The height-adjustable stand according to claim 1, wherein the positioning member further comprises a stop member extending outwardly from the threaded rod, the nut is between the sidewall and the stop member.

4. The height-adjustable stand according to claim 1, wherein the locking member comprises a ring connected to ends of the two guide rods, the flange is between the ring and the sidewall.

5. The height-adjustable stand according to claim 1, further comprising a stabilizing assembly, wherein the stabilizing assembly comprises an actuating plate, a pair of side plates, two linkage bars, and two elastic members, the height extender further comprises two connecting walls protruding from the front wall and two rectangular members between the two connecting walls, the actuating plate comprising two sliding shafts that respectively extend through the two rectangular members, each of the two elastic members is arranged around one of the two sliding shafts to apply a spring force to the actuating plate, each of the two side plates comprises a protruding shaft slidably extending through one of the connecting walls, the linkage bar comprises two ends rotatably connected to the shaft and the actuating plate.

6. A flat panel display comprising:
a display body; and
a height-adjustable stand comprising:
a base defining a receiving space and a sidewall;
a height extender slidably received in the receiving space and comprising a front wall and an upper connecting end, the front wall defining a plurality of slots arranged along a sliding direction of the height extender, the upper connecting end being configured for connecting with a flat panel display device;
a positioning member comprising a threaded rod and a flange extending outwardly from the threaded rod, the threaded rod slidably extending through the sidewall of the base and comprising a distal end, the distal end being able to be received in one of the plurality of slots to set the height extender in a desired position, the flange being external to the base; and
a locking member comprising a nut and two guide rods protruding from the nut, the two guide rods slidably extending through the sidewall, the nut being arranged in the receiving space and being threaded on the threaded rod of the positioning member, wherein as the threaded rod turns about a predetermined direction, the nut moves toward the sidewall of the base and terminates when abutting against the sidewall.

7. The flat panel display according to claim 6, wherein the positioning member further comprises a knob formed at one end of the threaded rod.

8. The flat panel display according to claim 6, wherein the positioning member further comprises a stop member extending outwardly from the threaded rod, the nut is between the sidewall and the stop member.

9. The flat panel display according to claim 6, wherein the locking member comprises a ring connected ends of the two guide rods, the flange is between the ring and the sidewall.

10. The flat panel display according to claim 6, further comprising a stabilizing assembly, wherein the stabilizing assembly comprises an actuating plate, a pair of side plates, two linkage bars, and two elastic members, the height extender further comprises two connecting walls protruding from the front wall and two rectangular members between the two connecting walls, the actuating plate comprising two sliding shafts that respectively extend through the two rectangular members, each of the two elastic members is arranged around one of the two sliding shafts to apply a spring force to the actuating plate, each of the two side plates comprises a protruding shaft slidably extending through one of the connecting walls, the linkage bar comprises two ends rotatably connected to the shaft and the actuating plate.

* * * * *